United States Patent
Chapman (10) Patent No.: US 10,892,815 B2
(45) Date of Patent: Jan. 12, 2021

(54) EVM REQUIREMENTS FOR WIRELESS COMMUNICATION

(71) Applicant: Telefonaktiebolaget LM Ericsson (publ), Stockholm (SE)

(72) Inventor: Thomas Chapman, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/323,715

(22) PCT Filed: Aug. 22, 2016

(86) PCT No.: PCT/EP2016/069818
§ 371 (c)(1),
(2) Date: Feb. 6, 2019

(87) PCT Pub. No.: WO2018/036608
PCT Pub. Date: Mar. 1, 2018

(65) Prior Publication Data
US 2019/0173560 A1    Jun. 6, 2019

(51) Int. Cl.
*H04L 12/26* (2006.01)
*H04B 7/08* (2006.01)
*H04B 17/10* (2015.01)
*H04B 7/06* (2006.01)
*H04B 7/10* (2017.01)
*H04B 7/0413* (2017.01)

(52) U.S. Cl.
CPC .......... *H04B 7/086* (2013.01); *H04B 7/0617* (2013.01); *H04B 7/10* (2013.01); *H04B 17/10* (2015.01); *H04B 17/104* (2015.01); *H04B 7/0413* (2013.01)

(58) Field of Classification Search
CPC .......... H04B 3/46; H04B 7/0413; H04B 7/06; H04B 7/0617; H04B 7/08; H04B 7/086; H04B 7/10; H04B 17/002; H04B 17/0027; H04B 17/003; H04B 17/0032; H04B 17/0035; H04B 17/10; H04B 17/104; H04L 12/26; H04L 43/08; H04L 43/0852; H04L 43/50
See application file for complete search history.

(56) References Cited

U.S. PATENT DOCUMENTS

| | | | | |
|---|---|---|---|---|
| 9,660,739 B2 * | 5/2017 | Reed | ...................... | H04B 17/29 |
| 9,893,819 B1 * | 2/2018 | Lee | ...................... | H04B 17/102 |
| 2016/0380682 A1 * | 12/2016 | Sienkiewicz | ........ | H04B 7/0413 |
| | | | | 375/267 |

OTHER PUBLICATIONS

Ericsson, EVM Requirement Considerations for eAAS, TSG-RAN Working Group 4 (Radio) meeting #80bis, 5 pages, Oct. 2016.*

(Continued)

*Primary Examiner* — Frank Duong
(74) *Attorney, Agent, or Firm* — Christopher & Weisberg, P.A.

(57) ABSTRACT

The present disclosure pertains to a method for testing a radio node for compliance with transmitter disturbance quality requirements. The method includes receiving transmission from the radio node in a plurality of directions from the radio node, and determining whether the received transmission complies with the requirements, the requirements pertaining to transmitter disturbance quality at least in the plurality of directions.

13 Claims, 10 Drawing Sheets

(56) References Cited

OTHER PUBLICATIONS

Chang et al, Smart Antennas for Advanced Communication Systems, IEEE, 17 pages, 2012.*
Foegelle, The Future of MIMO Over-the-Air Testing, IEEE, 9 pages, Sep. 2014.*
Ozev et al, Enhanced Error Vector Magnitude (EVM) Measurements for Testing WLAN Transceivers, ACM, 7 pages, Nov. 2006.*
Ericsson, Considerations for an OTA EVM requirement, 3GPP TSG-RAN WG4 #78bis, 6 pages, Apr. 2016.*
NEC, OTA EVM requirement for AAS, 3GPP TSG-RAN WG4 Meeting #80bis, 2 pages, Oct. 2016.*
Nokia, Alcatel-Lucent Shanghai Bell, OTA EVM of AAS base station transmitters, TSG-RAN Working Group 4 (Radio) meeting #80bis, 5 pages, Oct. 2016.*
International Search Report and Written Opinion dated Apr. 13, 2017 for International Application No. PCT/EP2016/069818 filed on Aug. 22, 2016, consisting of 9-pages.
3GPP TSG-RAN WG4 #78bis R4-162088; Title: Considerations for an OTA EVM requirement; Source: Ericsson; Agenda Item: 7.14.2.1; Document for: Discussion; Location and Date: San Jose, Mexico Apr. 11-15, 2016, consisting of 6-pages.
3GPP TSG-RAN WG4 #79 R4-164161; Title: OTA EVM; Source: Ericsson; Agenda Item: 7.14.2.1; Document for: Discussion; Location and Date: Nanjing, China May 23-27, 2016, consisting of 5-pages.

* cited by examiner

EVM REQUIREMENTS FOR WIRELESS COMMUNICATION

CROSS-REFERENCE TO RELATED APPLICATIONS

This application is a Submission Under 35 U.S.C. § 371 for U.S. National Stage Patent Application of International Application Number: PCT/EP2016/069818, filed Aug. 22, 2016 entitled "EVM REQUIREMENTS FOR WIRELESS COMMUNICATION," the entirety of which is incorporated herein by reference.

TECHNICAL FIELD

The present disclosure pertains to wireless communication systems, in particular to requirements for transmitting radio nodes and related testing.

BACKGROUND

In modern wireless communication systems, the use of beamforming becomes increasingly important. With ever larger number of antenna elements, it also becomes more flexible. To ensure acceptable transmission quality, radio nodes have to be tested to comply with specific requirements, which can be defined e.g. in telecommunication standards. However, some requirements may be unsuitable, as they may unduly limit the flexibility of beamforming systems.

SUMMARY

Beamforming allows a large variety of transmissions, which may be subject to different effects introduced by transmitter disturbance. It is an object of the present disclosure to provide an approach for requirements, and testing for compliance therewith, not unduly limiting the mode or type of beamforming allowed when transmitting.

Accordingly, there is disclosed a method for testing a radio node for compliance with transmitter disturbance quality requirements. The method comprises receiving transmission from the radio node in a plurality of directions from the radio node, and determining whether the received transmission complies with the requirements, the requirements pertaining to transmitter disturbance quality at least in the plurality of directions.

The method may be performed by a testing arrangement, e.g. a testing arrangement as described herein. With testing (determining whether the received transmission complies with the requirements) for a plurality of directions, the type of beamforming is to fulfill the requirements is left open, allowing for examples operators a wide range of possibilities for different types of beamforming, while ensuring acceptable transmission conditions. The transmission may be in the plurality of directions from the node by utilising sensors (receiving antennas), and/or by arranging/rearranging the radio node and/or sensors to cover the plurality of directions, e.g. by rotating either or both.

There is also described a testing arrangement for testing a radio node for compliance with transmitter disturbance quality requirements. The testing arrangement is adapted for, and/or comprises a receiving module for, receiving transmission from the radio node in a plurality of directions from the radio node. The testing arrangement is further adapted for, and/or comprises a determining module for, determining whether the received transmission complies with the requirements, the requirements pertaining to transmitter disturbance quality at least in the plurality of directions. The testing arrangement may be adapted for rotating the radio node, and/or may comprise one or more sensors (receiving antennas), which may be movable and/or rotatable.

The requirements may generally pertain to beamformed transmission, in particular to beamforming utilising an active antenna system (AAS). Such beamformed transmission may in particular utilise a plurality of antenna elements, and/or an active antenna system (AAS). It may be considered that the testing arrangement, and/or the radio node comprises the antenna elements and/or AAS. Generally, a radio node may be connected or connectable to a plurality of antenna elements and/or an antenna array, which may be an AAS. It may be considered that the method comprises, and/or the testing arrangement is adapted for and/or comprises a control module for, controlling the radio node for beamformed transmission. Controlling may comprise instructing and/or operating the radio node to provide beamformed transmission, e.g. via a suitable interface. The beamformed transmission may in be controlled to be directed into specific directions and/or angels, in particular into the plurality of directions, and/or pertain to specific transmission power/s, e.g. dependent on transmission direction or angle.

In general, receiving may comprise measuring received transmission, and/or may comprise comparing received and/or measured received transmission with a target. The target may for example represent a desired and/or intended transmission, e.g. a target transmission profile. Comparing may be based on, and/or consider, deviations of transmission over the transmission pathway, e.g. over the air, in particular between the radio node or the associated antenna elements or antenna array and the receiver of the testing arrangement. The transmission may be transmitted using an AAS. Generally, receiving from different angles may be performed successively in time, e.g. based on rotating the radio node and/or sensor/s.

It may be considered that the plurality of directions of the requirements is defined relative to a fixed coordinate system or direction (e.g., a cardinal direction and/or in relation to global coordinates), and/or relative to an axis of the radio node, and/or horizontally and/or azimuthally and/or vertically. The plurality of directions of the requirements may be independent of a direction on e.g. a main lobe.

The plurality of directions of the requirements may represent and/or comprise a range of directions, e.g. an interval. A direction may generally pertain to a two-dimensional angular direction or angle (e.g., in a section, for example horizontal or vertical or azimuthal) and/or a 3-dimensional angular direction or angle, e.g. a solid or spatial angle, respectively a range thereof. A range or interval of directions or angles may be continuous, and/or the plurality of directions may pertain to a plurality of ranges or interval, e.g. diametrally arranged to a common mid-point. The plurality of directions may be indicated and/or represented by a set of directions. It may be considered that the plurality of directions covers less than 360 degrees or 180 degrees or 120 degrees or 90 degrees in 2 dimensions, and/or less than $4\pi$ or $2\pi$ or $\pi$ or $\pi/2$ in solid angle. It may generally be considered that the requirements prescribed a quantity associated to transmitter disturbance quality over the set or plurality of directions, respectively a quantity distribution, e.g. a maximum quantity or maximum quantity distribution. Transmission from a radio node may be determined to comply with the requirements, if the received transmission complies with the prescribed quantity or quantity distribution at least over the set or plurality of angles (e.g., does not exceed a maximum quantity).

In some variants, the requirements pertain to Over-The-Air, OTA, requirements. Such requirements may pertain to a transmission propagated from the antenna array, e.g. through surrounding air. The requirements may pertain to a certain distance (OTA distance), which may be prescribed. It may be considered that receiving comprises receiving transmission propagated over air, and/or over the prescribed distance. However, it may in some variants be considered that receiving is performed in direct connection to the antenna array or radio node, and/or at a different distance. In such cases, determining may comprise transforming and/or mapping received transmission and/or corresponding measurements to OTA and/or a prescribed distance.

The requirements may generally be independent of the mode or beam-form of beamformed transmission. A mode of beamforming may pertain to the amount of antenna elements to be used for beamforming, or type of beams or lobes of beams to be used for signaling. Different forms of beams may differ e.g. in spatial angle, direction and/or number and/or extension of lobe/s (e.g., main lobe and/or side lobe/s), etc. In particular, the requirements may be independent of a beam direction and/or direction of a main lobe of a beam. In this context, the requirements may be defined such that plurality of directions are independent of the direction of transmission of a beam and/or the direction of a lobe, in particular main lobe (or side lobe).

There may also be considered a radio node for a wireless communication network, the radio node having undergone any one of the methods described herein. A radio node belonging to a series represented by a test apparatus that has undergone any one of the methods may be considered a radio node having undergone the method. Having undergone the method may represent the radio node having been tested for compliance with the requirements.

Moreover, a program product comprising instructions may be considered. The instructions are adapted for causing control circuitry to perform and/or control any one of the methods described herein, in particular if executed by the control circuitry.

A storage medium storing a program product as described herein and/or comprising instructions is also proposed. The instructions may be adapted for causing control circuitry to perform and/or control any one of the methods described herein, in particular if executed by the control circuitry. A storage medium may comprise at least one of a memory, which may be volatile or non-volatile, a buffer, a cache, an optical disc, magnetic memory, flash memory, etc.

A testing arrangement may generally comprise a chamber adapted for receiving and/or accommodating a radio node, which may be the node to be tested. The testing arrangement may comprise one or more receivers for receiving transmission from the radio node, and/or control circuitry adapted for controlling the testing arrangement and/or the radio node, respectively transmission from the radio node. It may be considered that the testing arrangement comprises, and/or is connected or connectable to, a suitable power supply.

Transmitter disturbance quality (TDQ) may pertain to the quality of transmission of a transmitter, e.g. a radio node and/or associated antenna array and/or radio circuitry. TDQ may be based on characteristics of individual transmitters, and/or represent self-distortion and/or self-interference of a transmitter. The quality of transmission may in particular represent a deviation of (actual) transmission from a controlled or target transmission (respectively an actual transmission profile (e.g., angular or spatial) from a controlled or target transmission profile). Such deviation (leading to a disturbance in the signal) in particular may be due to transmitter-inherent characteristics, e.g. due to non-linear behaviour and/or less than perfect components (for example, radio circuitry, in particular, amplifiers), and/or disregard, and/or be independent of, propagation effects (e.g., propagation over the air). Transmitter disturbance quality requirements may for example be represented by Error Vector Magnitude (or Measure), EVM requirements. EVM is generally a very suitable way of representing transmitter disturbance quality in particular for beamforming, however, other parametrizations may be possible, e.g. a parametrization normalized to an isotropic or angle-limited transmission power, or a relative allowed error parametrization. EVM may represent errors in constellation points of transmissions. For determining TDQ, propagation effects may be considered, e.g. in a controlled test arrangement, and/or based on measurements and/or a propagation model.

A radio node may generally be any node adapted for beamformed transmission, in particular a network node, which may be a base station (e.g., an eNodeB or equivalent) or relay station or subnode (e.g., micro, femto, pico or other node), or in some cases a terminal or user equipment or MTC (Machine-Type Communication) device. A radio node may comprise control circuitry and/or radio circuitry, and/or comprise and/or be connected or connectable to antenna circuitry. Antenna circuitry may in particular comprise an antenna array, which may represent or be part of an AAS. Beamforming may be active beamforming, e.g. utilising an AAS.

BRIEF DESCRIPTION OF THE DRAWINGS

The drawings are provided to elucidate the approaches and concepts described herein, and are not intended to limit their scope.

The drawings comprise.

DETAILED DESCRIPTION

In the following, it is exemplary referred to (radio) base stations. Unless specifically stated otherwise, any reference to such may be replaced by a reference to a radio node.

Active Antenna Systems (AAS) are an important part of LTE evolution and an essential part of 5G. AAS is a generic term that is often used to describe transmitting nodes (transmitters), e.g. radio base stations that incorporate a large number of separate transmitters (e.g., comprising antenna elements) that can be used for MIMO and beamforming, and integrate active transmitter components and radiating elements. There are several advantages to AAS implementation. One is that the integrated design reduces loss factors and can reduce overall power consumption. Secondly, form factor (i.e. size and/or weight) can be reduced. Related to this, there is some potential for site simplification. For LTE, AAS base stations can offer beamforming functionality, such as cell splitting, variable downtilt and user specific beamforming (e.g., aiming beams individually to specific users/user equipments). In 3GPP, a number of air interface enhancements have been specified, including the possibility of up to 16 CSI-RS ports and CSI-RS beamforming to facilitate the exploitation of AAS base stations.

It is envisaged that NX and 5G may operate in higher frequency bands than today. For example, 4 GHz is discussed for first systems in Japan, whilst WRC15 may allocate spectrum up to 6 GHz. Further into the future, it is envisaged that ITU and/or regional regulators may allocate mmWave spectrum in in the range 10-100 GHz.

At higher frequencies, propagation losses are much greater than in today's bands. Furthermore, it is envisaged that transmissions will take place within higher bandwidths. Since the transmit power of both base stations and devices is limited by physical constraints and considerations such as EMF (Maximum allowed Electromagnetic Field strength), it is not possible to compensate the increased penetration losses and provide sufficient SINR within wider bandwidths simply with increased transmit power. In order to achieve the link budgets required for high data rates, beamforming will be necessary. It is therefore expected that integrated active arrays will become a mainstream base station building practice in the 5G era.

Figure 1:
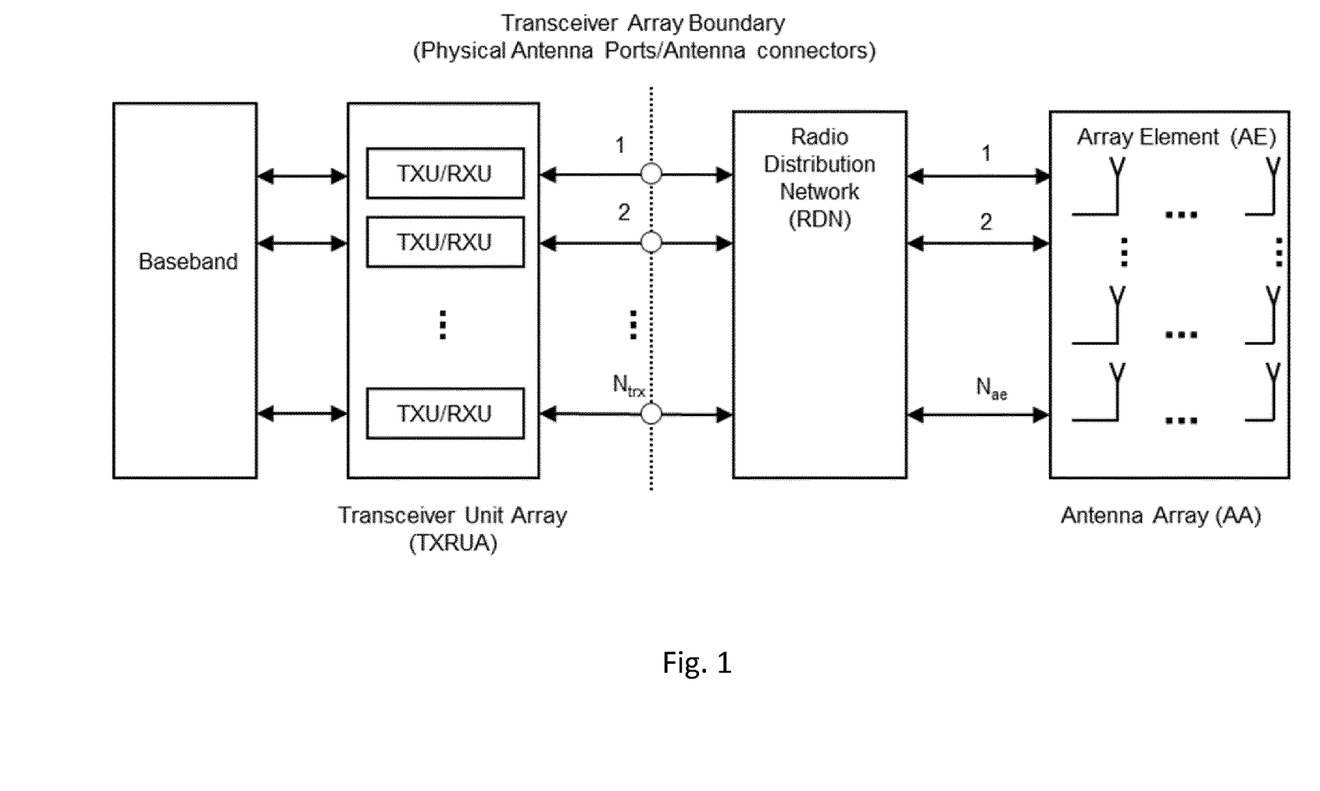
FIG. 1, showing an example of an AAS architecture.

In order to achieve beamforming, an AAS base station will possess a number of logical components as illustrated in FIG. 1. The base station comprises an antenna array (representing antenna circuitry, as well as radio circuitry comprising a radio distribution network, a transceiver unit array and a baseband processing arrangement. The baseband processing can be used to perform user specific TX and RX beamforming. Although a logical part of the base station, the baseband processing may not be physically co-located with the other components. The transceiver unit array contains active circuits that perform actions such as signal conditioning, amplification and filtering in transmit and receive.

There may be a different number of transmitters to receivers and the transmitters and receivers may be implemented as single modules or separately. The Radio Distribution Network (RDN) distributes TX signals between the transceiver unit array and transmit antenna elements and RX signals between receive antenna elements and the transceiver unit array. The RDN may comprise splitting and combining of signals. The antenna array comprises a group of radiating elements (i.e. single antennas). The radiating elements may be TX only, or RX only, or both RX and TX (the latter may be referred to as transceiver elements).

Beamforming is performed by applying amplitude and phase variations to the signals radiated from different antenna elements. The amplitude and phase variations may be applied at any stage in the architecture of FIG. 1. Typically, for very dynamic and/or user specific beamforming, the amplitude and phase weights are set in the baseband.

Figure 2:
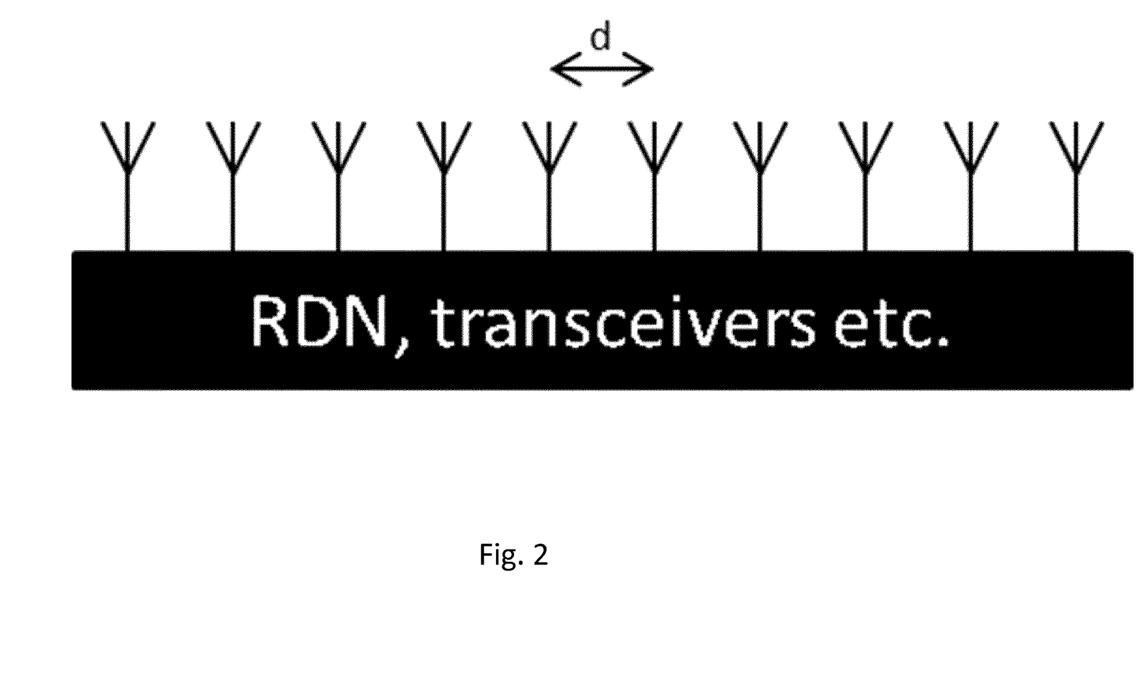
FIG. 2, showing an example of a uniform linear array.
Figure 3:
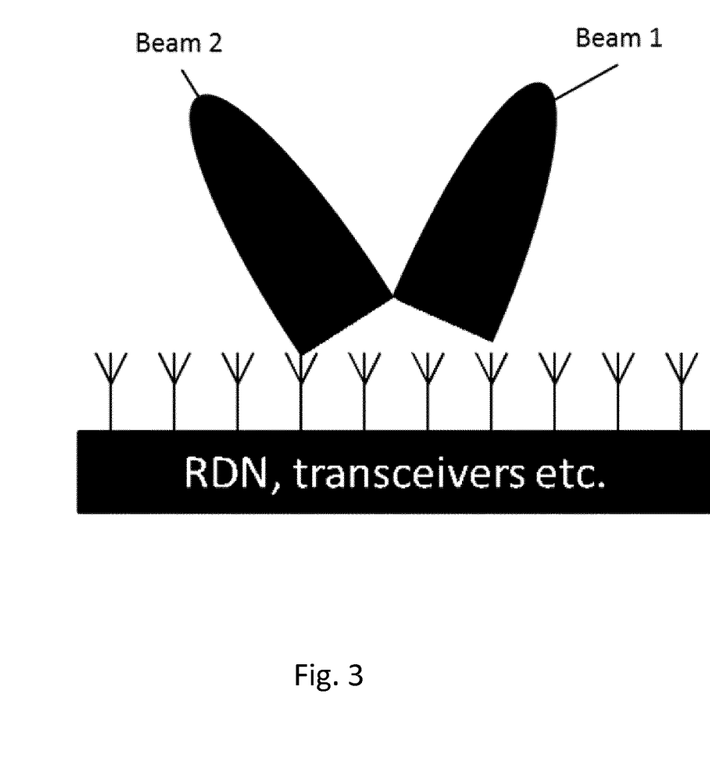
FIG. 3, showing an example of different beams steered from a uniform linear array.

A very common type of array, known as a uniform linear array, is shown in FIG. 2. The depicted array comprises a set of antenna elements arranged in one dimension with a uniform spacing d. It is possible for the depicted uniform linear array to transmit beams at different angles with respect to the antenna plane, as depicted in FIG. 3. A simple means to direct a beam is to apply a so-called linear phase progression, calculated as follows:

$$w_n = e^{-j\frac{2\pi z_n \cos(\vartheta_c)}{\lambda}} \text{ for } n = 1 \ldots N$$

Where:

n is an index into the antennas;
$z_n$ is the position of the $n^{th}$ antenna along the z axis in the coordinates system;
$w_n$ are the phase weights applied at each of the N antennas;
$\lambda$ is the wavelength;
$\vartheta_c$ is the beam steering direction.

More complex types of array include 2D linear arrays, arrays with non-uniform antenna spacing in a single plane and conformal arrays, in which antenna elements are arranged in 3 dimensions.

The term beam steering refers to altering the direction of a beam, and in particular the main lobe of a beam by such techniques. It should be noted that in beamforming, there is usually produce an angular distribution of radiation including a main lobe, to which one or more, more or less pronounced, sidelobes may be associated.

Beamforming may be controlled by, and/or represented by precoding, in which precoding weights are assigned to form associated beams. The 3GPP specifications include a number of methods for generating precoding weights. A commonly used method is codebook based precoding, in which a standardized codebook consists of sets of beamforming weights. Each codebook entry contains a set of weights that can generate a beam. One of the codebook entries is selected, according to feedback from a terminal or UE (e.g., in terms of Channel State Information, CSI, procedures). Transmission modes 4, 5, 6, 9 and 10 use codebook based precoding.

Alternatively, TM7, 8 and 9 include a UE specific demodulation reference signal that is precoded along with the symbols carrying data. This enables the base station to select precoding weights without the need for any codebook. An example of a means for selecting weights is reciprocity based precoding in TDD, in which knowledge of the TDD channel based on uplink measurements is used to derive downlink precoding weights.

An AAS array may typically use methods such as those described above to direct beams in different directions at different times. A beam is directed towards a particular user or group of users when the user is scheduled. By directing energy using beamforming, received signal power of the scheduled user can be increased whilst interference towards other users is decreased.

Due to imperfect antenna elements and radio circuitry, disturbance or distortion will be introduced into transmissions. As such disturbances are usually unique to each transmitter, they will contribute individually to a beamformed signal.

EVM is a measure of self-distortion or self-interference created in a transmitter (e.g., individual antenna element of an array, and as such an example of TDQ. Self-interference may be created by a number of processes in the transmitter, including clipping and signal conditioning algorithms, phase noise, PA nonlinearity and filter nonlinearity amongst other things.

A minimum requirement on EVM performance (i.e. a maximum allowed ratio of wanted signal power to self-interference power) may be set as TDQ requirement on radio nodes like base stations, since the self-interference will influence the maximum data rates achievable in the system.

Figure 4:
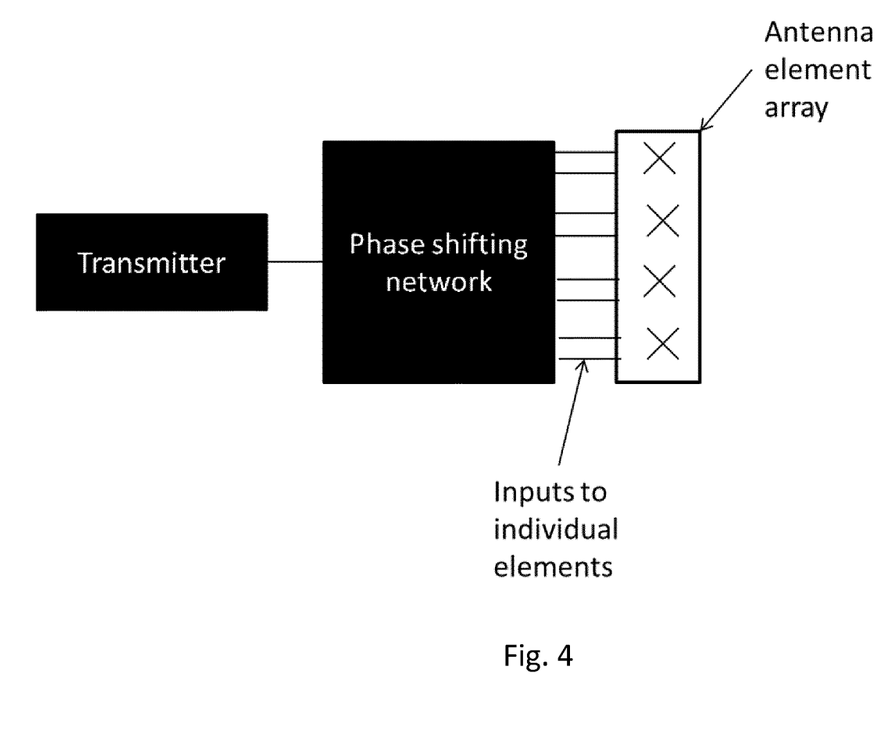
FIG. 4, showing a representation of a non-AAS base station consisting of a single transmitter and a passive antenna.

In a conventional (i.e. non AAS) base station, the signal generated by the transmitter is fed to a passive antenna, as illustrated in FIG. 4. All components of the signal are subject to the spatial radiation pattern of the antenna. Thus, the ratio of the power of the wanted signal to the power of the distortions in the wanted signal remains the same in all directions in space, because both the wanted signal and the distortions are subjected to beamforming.

EVM is a measure of the relative power of the wanted signal and the distortion, and thus if the ratio of wanted signal to distortion is preserved in all directions in space, then the EVM will be the same in all directions in space.

Figure 5:
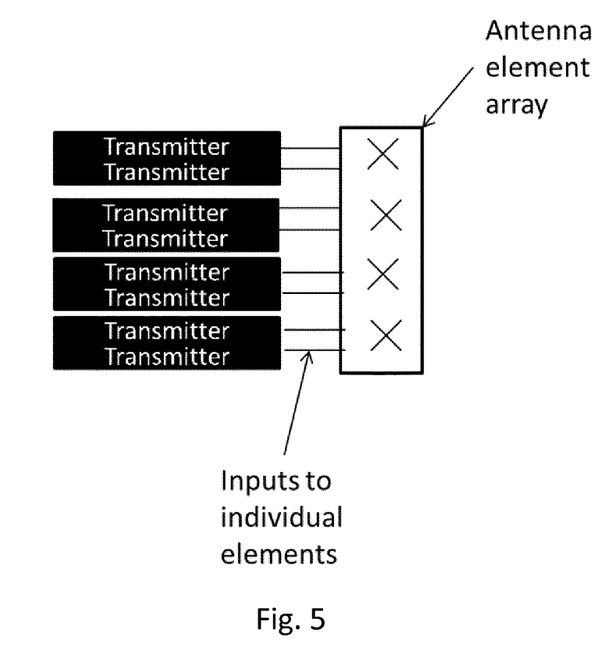
FIG. 5, showing a representation of an AAS BS with one transmitter per antenna element.

In an AAS radio node or base station, the transmitted signal is created by a number of different transmitters, as illustrated in FIG. 5.

The transmitters each transmit the wanted signal with a transmitter specific amplitude and/or phase weighting. This causes the combined spatial pattern from the transmitters to be beamformed. However, at least some of the sources of self-interference in the transmitters may produce uncorrelated distortion signals. If different and uncorrelated distortion signals are transmitted from different transmitters, then the distortion will not experience beamforming.

Figure 6:
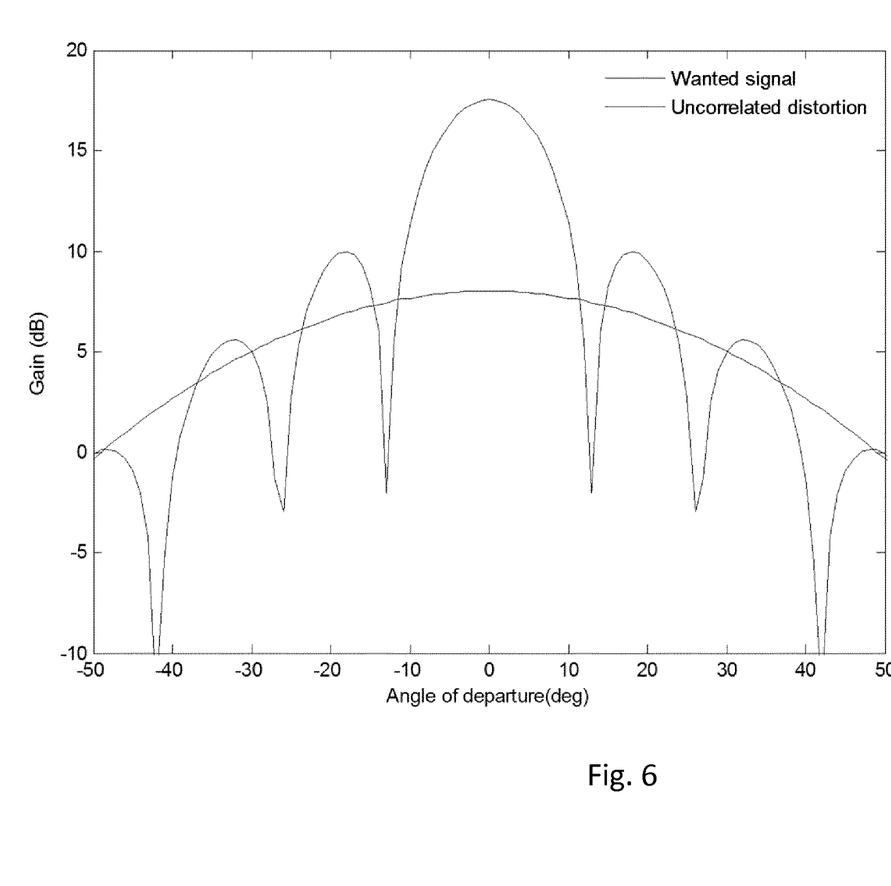
FIG. 6, showing a representation of a spatial cut of the output of an AAS BS, showing the spatial pattern of a beamformed wanted signal and uncorrelated distortion.

In this way, the spatial pattern of the wanted signal (target profile) and the distorted or disturbed (actual) profile may differ. FIG. 6 illustrates an example of a spatial cut of wanted signal and distortion signals, in which the wanted signal is beamformed but the distortion signal is not.

Figure 7:
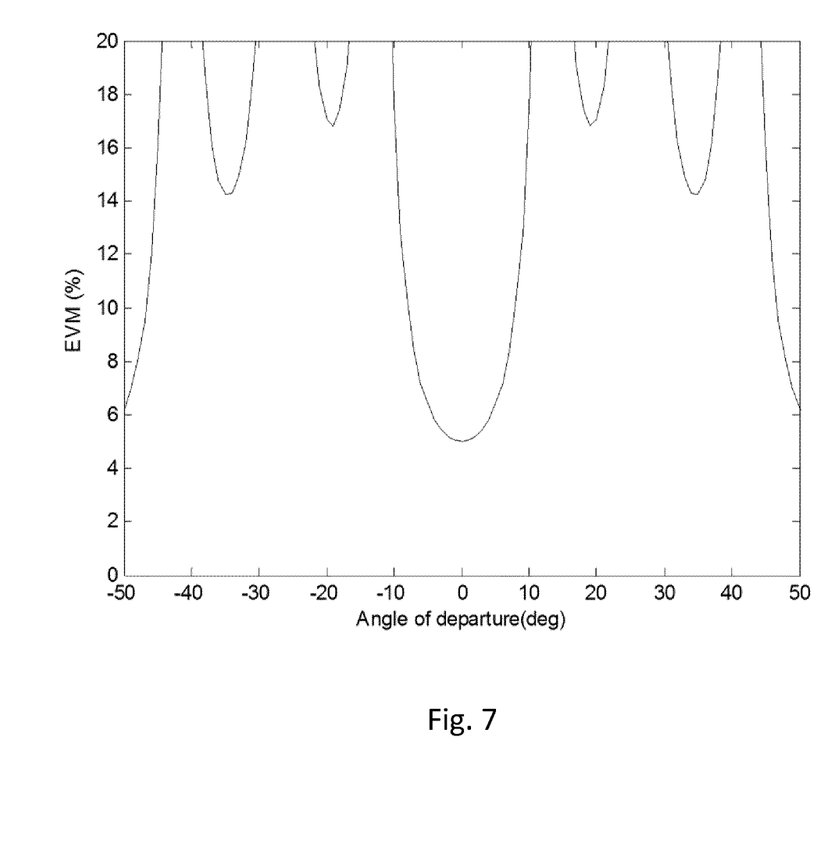
FIG. 7, showing an illustration of the spatial variation of EVM associated with FIG. 6.

If in different directions the relative levels of wanted signal and distortion vary, then the EVM will vary in space. FIG. 7 illustrates spatial variation of EVM caused by the wanted signal and distortion patterns illustrated in FIG. 6.

In general, it is likely that in the direction of the centre of a beam (main lobe), the spatial EVM will be better (lower) than in directions of sidelobes of the beam. Thus in order to ensure that an acceptable EVM is achieved for all UEs that might be scheduled by the system, the EVM requirement should also be met in sidelobes for systems that do not always perform user specific beamforming.

In general, a base station that can perform beamforming will aim to steer the centre of the beam towards a scheduled user such that the RX power for the user is maximized. Considering this likely aspect of beamforming, it would make sense for the OTA EVM requirement to be set such that the EVM is always met at the centre of a beam, regardless of where the beam is steered.

However, there may be some circumstances in which a base station may not steer the centre of a main lobe of a beam towards a user. One example of such circumstances could be when the base station is serving legacy UEs that do not possess signaling functionality to support such user specific beamforming. In this case, the base station may transmit a beam that covers all or a part of the cell. The scheduled users may then not receive from the direction of the centre of a beam, but rather from a sidelobe direction.

Setting a requirement on EVM in sidelobes however would set a stricter than necessary requirement for systems that do perform user specific beamforming.

One solution could be to set an EVM requirement in the main lobe only for systems declared to perform user specific beamforming only, and to set an EVM requirement applicable in other direction ns for systems that at least some of the time do not perform user specific beamforming. Creating two types of requirement would be undesirable however.

Furthermore, it is difficult to identify a generic set of directions other than at the centre of the main beam at which EVM should be stated to be applicable.

It is generally proposed that an TDQ, or preferably EVM, directions set be defined. An EVM directions set may refer to a set of directions in which the EVM requirement is expected to be fulfilled OTA.

It is not necessary to declare whether the TDQ/EVM requirement is fulfilled at the centre of a steered beam or in some other direction in the TDQ/EVM directions set. This allows different implementations, leaving it for the vendor of the radio node to decide whether to use user specific beamforming or some other beamforming method to reach a specific user in a specific direction within the EVM directions set.

It may generally be considered that the plurality of directions (of the TDQ requirements, respectively the EVM directions set) captures and/or comprises and/or defines a range of directions at which EVM requirements (e.g., maximum values for EVM) can or have to be met, which may include direction/s to which the centre of a main lobe cannot be steered, but rather a UE receives the transmitted signal at some point in the radiation pattern that is different from the main lobe (e.g., a side lobe).

The TDQ/EVM directions set can be represented using a polar plot. Also, potentially not every direction within the EVM directions set has to be tested, but rather a subset of directions.

Different TDQ/EVM directions sets may be associated to different frequency bands, RATs or operational modes of the base station. Generally, TDQ requirements and/or the plurality of directions (which may be seen as part of the requirements, and/or to be associated thereto) may be based on transmission frequency (or range of frequencies), and/or operational mode (e.g., TDD/FDD, and/or transmission mode). Due to prescriptions over a plurality of directions, the approaches described herein pertain to more than one requirement, even should numerically only one quantity be prescribed as requirements, e.g. a maximum TDQ/EVM for more than one direction.

The proposed approaches provide a unified method for meeting TDQ/EVM requirements for different types of radio nodes or base stations, e.g. with different beam steering and scheduling strategies. This provides maximum flexibility while ensuring well-described requirements, e.g. for standardisation.

The approaches will not cause overly stringent requirements for systems that only provide user specific beamforming, whilst also enabling systems that do not do user specific beamforming to be accommodated for.

A TDQ/EVM directions set may be declared or defined for a particular RAT (Radio Access Technology, for example LTE, LTEE or NR) and/or operating mode of the base station. It may be considered that the directions set includes all directions between +90 degrees and −90 degrees on two (orthogonal) axes, or subsets thereof.

For ensuring that radio nodes fulfill such requirements, the radio node (or a representative of its series or class), may have to be tested, e.g. by performing a method for testing for compliance with the TDQ requirements. Such a test may lead to limits on beamforming parameters (e.g., amplitudes, phases, etc.) used for beamforming, in particular in specific directions (which do not have to be the plurality of directions of the requirements, but may lead to transmission into one or more of these directions).

Figure 8:
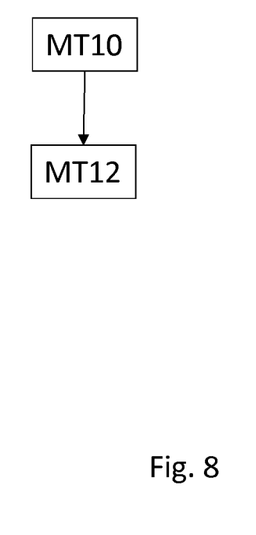
FIG. 8, schematically showing a method for testing a radio node for compliance with TDQ requirements.

FIG. 8 schematically shows a method for testing a radio node for compliance with TDQ requirements. The method comprises an action MT10 of receiving transmission from the radio node in a plurality of directions from the radio node. The method also comprises an action MT12 of determining whether the received transmission complies with the requirements, the requirements pertaining to at least transmitter disturbance quality in the plurality of directions.

Figure 9:
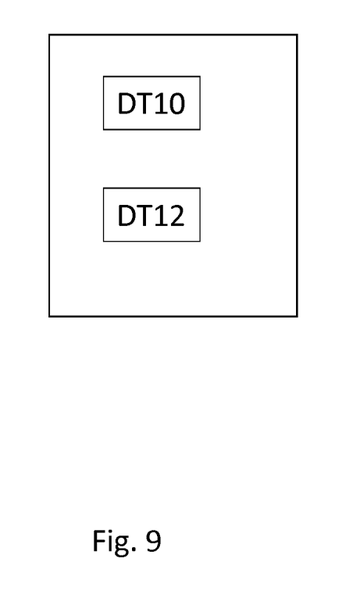
FIG. 9, schematically showing an associated testing arrangement.

FIG. 9 schematically shows an associated testing arrangement. The testing arrangement may comprise a receiving module DT10 for performing action MT10, and a determining module DT12 for performing action MT12.

Figure 10:
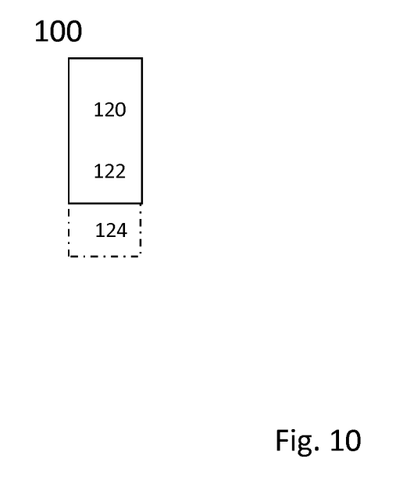
FIG. 10, showing an exemplary radio node.

FIG. 10 shows an exemplary radio node 100. Radio node 100 comprises control circuitry 120, which may comprise a controller connected to a memory. Any module, e.g. receiving module and/or transmitting module and/or control or processing module, of the radio node may be implemented in and/or executable by the control circuitry 120. The control circuitry is connected to control radio circuitry 122 of the radio node 100, which provides receiver and transmitter and/or transceiver functionality. An antenna circuitry 124 may be connected or connectable to radio circuitry 122 for signal reception or transmittance and/or amplification. The radio node 100 may have undergone a testing method as described herein. The antenna circuitry may be connected to and/or comprise an antenna array.

It should be noted that a testing arrangement may comprise control circuitry, which may generally be adapted to perform and/or control a method for testing as described herein. It may be considered that the testing arrangement comprise one or more sensors, respectively one or more receivers, to receive transmission from a radio node, which may be arranged or accommodated in a receiving chamber of the testing arrangement. Such a chamber may be radio-isolated. Sensors and/or receivers may be representative of radio circuitry.

Requirements pertaining to a plurality of directions may define requirements for these directions and/or to be complied with in (at least) each direction of the plurality of directions. A requirement may define a quantity (or range) representing TDQ to be complied with, e.g. a maximum value or maximum values, in particular maximum EVM. Compliance with requirement/s may refer to a quantity and/or condition of the requirement being fulfilled, e.g. a maximum quantity not being exceeded, or the transmission being within a prescribed quantity range.

Each node (e.g., radio node) or terminal, or testing arrangement, may comprise radio circuitry and/or control circuitry and/or antenna circuitry, which may be arranged to utilize and/or implement one or more than one radio access technologies. Radio circuitry of a radio node or terminal or testing arrangement may generally be adapted for the transmission and/or reception (e.g., as sensor) of radio waves, and in particular may comprise a corresponding transmitter and/or receiver and/or transceiver, which may be connected or connectable to antenna circuitry and/or control circuitry. Control circuitry of a testing arrangement, node or terminal may comprise a controller and/or memory arranged to be accessible for the controller for read and/or write access. The controller may be arranged to control the communication and/or the radio circuitry and/or provide additional services. Circuitry of a testing arrangement or node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE and/or LTE-E or NR.

Transmission may comprise radio transmission, in particular wirelessly and/or via an air interface. Transmission may be in a single direction or multi-directional. It may be considered that transmission comprises one, or a plurality of different, transmission event/s. Different transmission events may be separate in time (respectively, utilise different antenna elements).

A radio node like network node or base station may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a radio node or network node, in particular a radio network node, comprises radio circuitry and/or control circuitry for wireless communication. It may be envisioned that a base station or network node is adapted for one or more RATs, in particular LTE/E-UTRA and/or LTEE or NR. Radio circuitry may comprise for example one or more receiver devices and/or transmitter devices and/or transceiver devices. Control circuitry may include a (or more than one) controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, e.g. according to an LTE standard. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for cellular communication between two nodes or terminals of a wireless communication network, in particular two user equipments.

An antenna array may comprise a plurality of antennas or antenna elements, which may be individually controllable and/or be controllable for beamforming. An antenna array may in particular comprise 128 or more, or 256 or more, or 512 or more antenna elements. An antenna array, and/or the network node and/or associated circuitry, may be adapted for Massive MIMO.

| Abbreviation | Explanation |
|---|---|
| AA | Antenna Array |
| AAS | Active Antenna System |
| AE | Antenna Element |
| CSI | Channel State Information |
| EIRP | Equivalent Isotropic Radiated Power |
| EMF | Electromagnetic Field |
| EVM | Error Vector Measure |
| GHz | Giga Herz |
| LTE | Long Term Evolution |
| LTEE | LTE Evolution |
| MIMO | Multiple Input Multiple Output |
| NR | Next Radio, an evolving 3GPP 5G standard |
| OTA | Over the Air |
| RAT | Radio Access Technology |
| RDN | Radio Distribution Network |
| RS | Reference Symbols |
| RX | Receive |
| RXU | Receiver Unit |
| SINR | Signal to Interference and Noise Ratio |
| TDD | Time Division Duplex |
| TX | Transmit |
| TXRUA | Transmitter and Receiver Unit Array |
| TXU | Transmitter unit |
| WRC | World Radio Congress |

A wireless communication network may generally be any network providing radio access for telecommunication. It may comprise a Radio Access Network (RAN), e.g. according to UMTS, LTE or a related standard, a Next Radio standard or generally a 4G or 5G standard. A network node may generally be any radio network node, e.g. of a RAN. For example, a network node may be a base station, eNodeB, macro node, micro node, relay node, etc. A terminal may be any device providing a possible termination point for telecommunication utilising the wireless communication network. The terminal may be adapted for communication with or via the network, in particular a network node of the network. A terminal may be implemented as a user equipment (UE), or Machine-Type-Communication (MTC) device. It may be considered that a terminal is mobile, however, stationary terminals may be envisioned. A terminal may in particular be a smartphone, mobile phone, tablet, laptop, desktop computer, sensor arrangement or a machine adapted e.g. for MTC.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for testing a radio node for compliance with transmitter disturbance quality requirements, the method comprising:
receiving a transmission from the radio node in a plurality of directions from the radio node, the plurality of directions including a predefined subset of directions; and
determining whether the received transmission complies with the transmitter disturbance quality requirements at least in each direction of the predefined subset of the plurality of directions, the transmitter disturbance quality requirements including at least error vector magnitude (EVM) performance requirements, EVM being at least a measure of wanted signal power and self-interference power of a transmitter of the radio node, the predefined subset of directions set being a set of directions in which the EVM requirement is expected to be fulfilled over the air (OTA).

2. The method according to claim 1, wherein the transmitter disturbance quality requirements pertain to beamformed transmission.

3. The method according to claim 1, wherein the plurality of directions of the transmitter disturbance quality requirements is defined as at least one of relative to a cardinal direction, relative to an axis of the radio node, horizontally and azimuthally.

4. The method according to claim 1, wherein at least one of the plurality of directions of the transmitter disturbance quality requirements represents and comprises a range of directions.

5. The method according to claim 1, wherein the transmitter disturbance quality requirements pertain to Over-The-Air, OTA, requirements.

6. The method according to claim 1, wherein the transmitter disturbance quality requirements are independent of the mode or beam-form of beamformed transmission.

7. A testing system for testing a radio node for compliance with transmitter disturbance quality requirements, the testing system comprising:
radio circuitry configured to receive a transmission from the radio node in a plurality of directions from the radio node, the plurality of directions including a predefined subset of directions; and
control circuitry configured to determine whether the received transmission complies with the transmitter disturbance quality requirements at least in each direction of the predefined subset of the plurality of directions, the transmitter disturbance quality requirements including at least error vector magnitude (EVM) performance requirements, EVM being at least a measure of wanted signal power and self-interference power of a transmitter of the radio node, the predefined subset of directions set being a set of directions in which the EVM requirement is expected to be fulfilled over the air (OTA).

8. The testing system according to claim 7, wherein the transmitter disturbance quality requirements pertain to beamformed transmission.

9. The testing system according to claim 7, wherein the plurality of directions of the transmitter disturbance quality requirements is defined as at least one of relative to a cardinal direction, relative to an axis of the radio node, horizontally and azimuthally.

10. The testing system according to claim 7, wherein at least one of the plurality of directions of the transmitter disturbance quality requirements represents and comprises a range of directions.

11. The testing system according to claim 7, wherein the transmitter disturbance quality requirements pertain to Over-The-Air, OTA, requirements.

12. The testing system according to claim 7, wherein the transmitter disturbance quality requirements are independent of the beam-form of beamformed transmission.

13. A computer storage medium storing an executable computer program that, when executed by a control circuitry causes the control circuitry to at least one of perform and control a method for testing a radio node for compliance with transmitter disturbance quality requirements, the method comprising:
receiving a transmission from the radio node in a plurality of directions from the radio node, the plurality of directions including a predefined subset of directions; and
determining whether the received transmission complies with the transmitter disturbance quality requirements at least in each direction of the predefined subset of the plurality of directions, the transmitter disturbance quality requirements including at least error vector magnitude (EVM) performance requirements, EVM being at least a measure of wanted signal power and self-interference power of a transmitter of the radio node, the predefined subset of directions set being a set of directions in which the EVM requirement is expected to be fulfilled over the air (OTA).

* * * * *